(12) United States Patent
Hancock et al.

(10) Patent No.: US 6,494,113 B1
(45) Date of Patent: Dec. 17, 2002

(54) UNIVERSAL OPERATING LEVER EXTENSION

(76) Inventors: Dennis H. Hancock, 5752 N. Silverstone Cir., Mountain Green, UT (US) 84050; Jeffrey D. Hancock, 6702 S. 1800 East, Uintah, UT (US) 84405

( * ) Notice: Subject to any disclaimer, the term of this patent is extended or adjusted under 35 U.S.C. 154(b) by 40 days.

(21) Appl. No.: 09/696,588

(22) Filed: Oct. 26, 2000

(51) Int. Cl.[7] .......................... G05G 1/00; B62K 21/12
(52) U.S. Cl. ........................................ 74/544; 74/551.8
(58) Field of Search ...................... 74/543, 544, 551.3, 74/551.8; 16/421; 403/373, 374.2, 374.3

(56) References Cited

U.S. PATENT DOCUMENTS

| 3,937,629 | A | * | 2/1976 | Hamasaka | 74/551.8 |
| 4,077,236 | A | * | 3/1978 | Dalziel | 64/22 |
| 4,794,815 | A | * | 1/1989 | Borromeo | 74/551.1 |
| D316,989 | S | * | 5/1991 | Giambrone | D12/133 |
| 5,315,895 | A | * | 5/1994 | Kattus et al. | 74/551.8 |
| 5,683,201 | A | * | 11/1997 | Buaron | 403/325 |
| 5,868,515 | A | * | 2/1999 | Janssen | 403/97 |
| 6,003,405 | A | * | 12/1999 | Giard | 74/551.3 |
| 6,135,667 | A | * | 10/2000 | Debisschop | 403/290 |

FOREIGN PATENT DOCUMENTS

DE 3340893 A1 * 5/1984 .......... B62K/21/18

* cited by examiner

*Primary Examiner*—David A. Bucci
*Assistant Examiner*—Timothy McAnulty

(57) ABSTRACT

An extension lever to be attached to a control lever of a vehicle such as an all-terrain vehicle, snowmobile, or personal watercraft to extend the lever surface available to be contacted during control of the vehicle and particularly to provide a comfortable thumb and/or palm engagement surface on an extender connected to and pivotable with the control lever.

9 Claims, 4 Drawing Sheets

UNIVERSAL OPERATING LEVER EXTENSION

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to operating levers for vehicles and is particularly concerned with such levers as are commonly used in the control of a vehicle throttle setting, vehicle brake control and/or vehicle clutching operations.

Moore particularly, the invention is related to lever extensions employed to extend the length of existing levers and to make actuation of such levers and the particularly the holding of such levers for an extended period of time, more comfortable for a user.

2. Description of the Related Art

It has been recognized in the past that thumb operated throttle control levers commonly used on all-terrain vehicles, snowmobiles, personal water-craft and many other vehicles are often difficult to hold in a set position since the user's thumb may tire and release the throttle lever. This is particularly true when the throttle lever is being held for slow vehicle travel and when the pivoting end of the lever is at its greatest distance from a handgrip being grasped by the vehicle user, thus requiring maximum stretch by the user's hand to hold the control lever in position.

Even if the user is not holding the throttle lever for slow vehicle travel the hand stretch required to hold the lever in an open throttle position may be very tiring, particularly for persons having small hands. A user of a vehicle equipped with brake control levers or clutch control levers and having small hands may also find it difficult to operate the brakes or clutch of the vehicle.

In U.S. Patent No. 5,078,023 it is recognized that the thumb of a user of a vehicle equipped with a conventional throttle lever will often tire when the lever is actuated, particularly at low throttle settings when a wide spread between hand and thumb is required. The patent discloses use of primary and secondary pivoted levers to reduce the thumb pressure required as the throttle is opened and held during vehicle travel.

U.S. Patent No. 5,758,364 also recognizes that a user's hand may tire when actuating the throttle lever of a snowmobile. The patent discloses a glove to be worn by the user of the vehicle and having a strap extending between the forefinger and the thumb of the glove. The strap engages the throttle lever such that as the user's gloved hand grasps and rotates on the handgrip of a snowmobile the strap engages and actuates the throttle lever.

U.S. Patent No. 5,775,167 discloses use of a finger operated control lever for snowmobiles and other vehicles, which is a secondary acceleration device to the primary thumb operated throttle control lever of the vehicle. When the operator's thumb becomes tired, the finger throttle is used to continue riding while resting the thumb.

BRIEF SUMMARY OF THE INVENTION

The present invention provides an extension attachment that can be used with the operating levers of a great many different types and models of vehicles having thumb, finger and hand operated control levers. When used the extension lever may decrease the travel distance required for lever movement during control operations and allows a user to operate the control lever with the palm of the hand, after initiating pull on the extension lever with the thumb, rather than relying on a spread thumb for continued control lever operation.

The extension lever is made of durable materials and is molded to have a hand engaging extender and hinged attachment plates with individual segments to facilitate securement of the extender as a continuation of the control lever to which the extension lever is attached. A shoulder provided on at least one attachment plate extends beneath control lever structure to prevent turning of the extension lever relative to the control lever.

OBJECTS OF THE INVENTION

Principal objects of the present invention are to provide an extension lever that is easily and securely attached to existing control levers mounted to handlebars of a variety of types and models of vehicles to facilitate easier handling and operation of the control levers. More specifically, it is an object of the invention to provide an extension lever to be attached to and to project from an existing control lever, such as a thumb operated throttle control lever of a vehicle, for example, an all-terrain vehicle, a snowmobile or a personal water craft, and to greatly reduce fatigue of the thumb and hand of a user of the vehicle.

Other objects are to provide an extension lever that is durable, economically produced and that can be manipulated either by use of a thumb or by a portion of a user's palm while the user's hand is gripping a handlebar of the vehicle.

Still another object is to provide an extension lever that is comfortable to use and that is easy to install on a vehicle.

FEATURES OF THE INVENTION

Principal features of the extension lever of the invention include a one piece core construction with a hand engaging extender, projecting from a first one of a pair of attachment plates. The attachment plates have a pair of spaced apart 'living hinges' between them.

A second one of the pair of attachment plates has segments separated by slots extending from an edge of the attachment plates, through a thickened portion of the second attachment plate and into a thinner portion of the second attachment plate and towards the living hinges. The living hinges are formed in an even thinner portion that connects the attachment plates. A shoulder formed on the thickened portion of the second attachment plate will engage structure of a vehicle control lever to prevent turning of the extension lever with respect to the control lever.

The extension lever core is preferably molded of a very durable nylon material, or the like and the extender portion of the core, which connects to the thin nylon material connecting the first and second attachment plates is made sufficiently thick to remain rigid during installation and use on a vehicle. The extender projects from a thickened portion of the first attachment plate that has holes therethrough, corresponding to the holes through the second attachment plate. The holes through the first attachment plate are also counter-bored so that locking nuts to be threaded onto the bolts extending through the second attachment plate and through the first attachment plate during installation are recessed into the first attachment plate.

The extender core is coated with a suitable rubber material to provide an extender having a soft cover that is comfortable to the thumb and hand of a user. A hand engaging face of the extender is also curved to conform to a portion of a user's hand adjacent to the base of the thumb.

With the slots between adjacent segments of the second attachment plate extending through the thickest portion of the second attachment plate and into a thinner portion of the second attachment plate the segments are somewhat flexible. As the extension lever is positioned for securement to a control lever of a vehicle, the living hinges are bent to position the attachment plates at opposite sides of the control lever to which the extension lever is to be connected. The bolts through the segments of the second attachment plate are directed through the holes of the first attachment plate and are threaded into the nuts provided in the second attachment plate. Tightening of the nuts onto the bolts securely clamps the control lever between the attachment plates and positions the shoulder formed by the thickest portion of the second attachment plate to move beneath structure of the control lever. During such clamping the segments flex to allow the attachment plates and shoulder to conform to the shape of the control lever and insure clamping even on control levers of varying shapes.

Other objects and features of the invention will become apparent to those skilled in the art to which the invention pertains from the following detailed description and drawings, disclosing what is presently contemplated as being the best mode of the invention.

DETAILED DESCRIPTION

Figure 1:
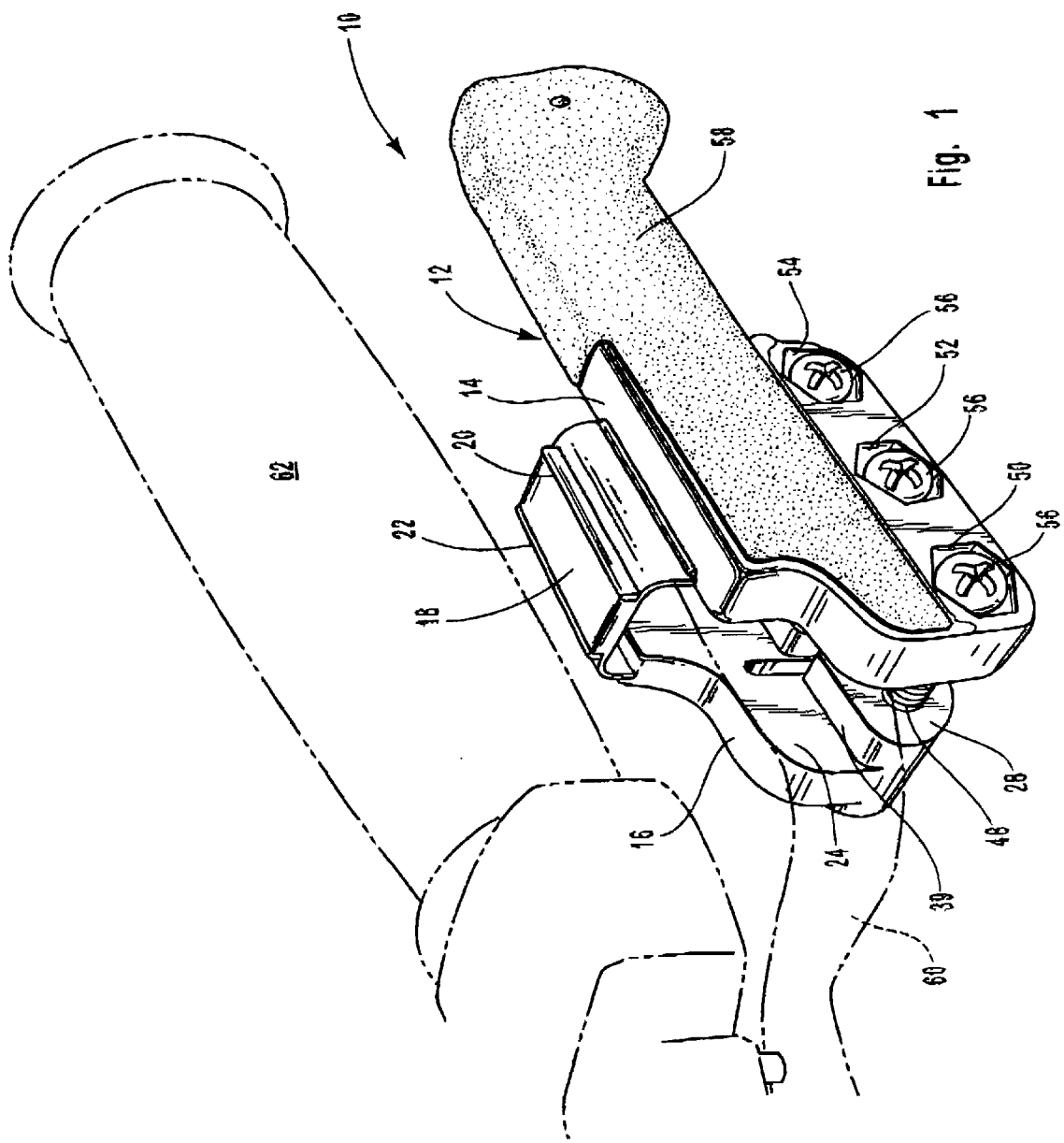
FIG. 1 is perspective view of an extension lever of the invention secured to a throttle control lever shown on a handlebar of a vehicle and with the throttle control lever and the handlebar shown fragmentarily and in phantom.
Figure 2:
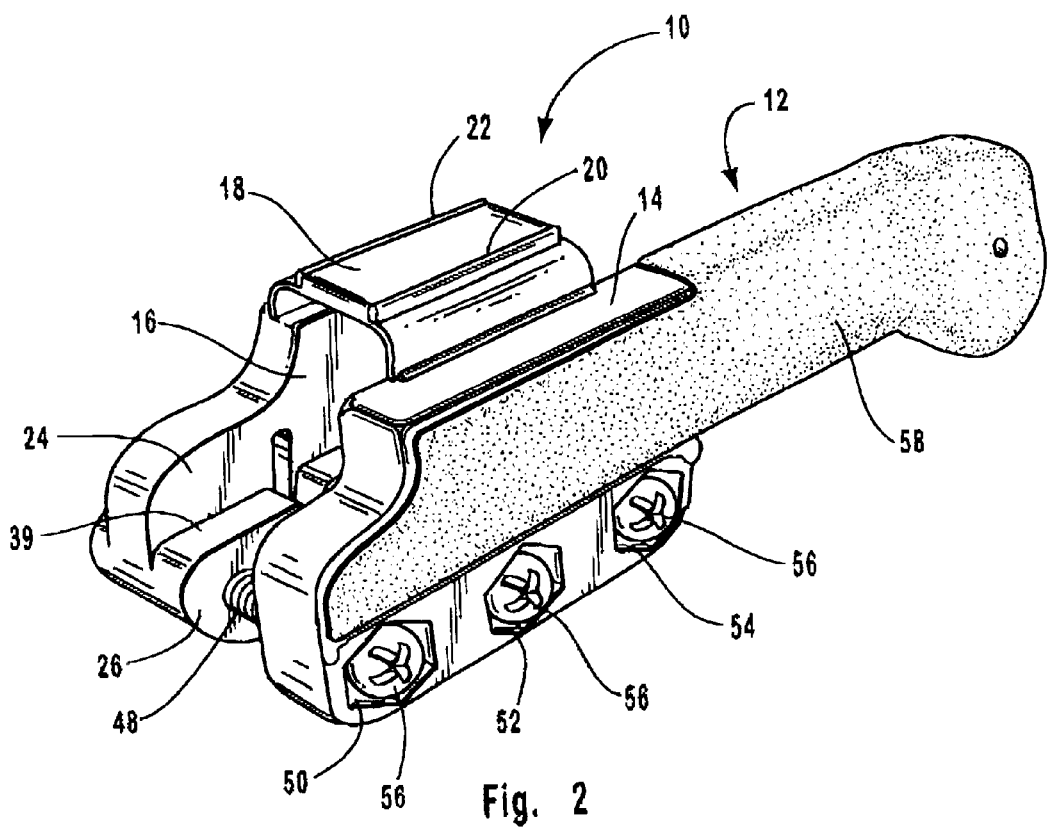
FIG. 2, a perspective view of the extension lever of the invention, shown with the attachment plates folded along the living hinges for installation on a throttle control lever.
Figure 3:
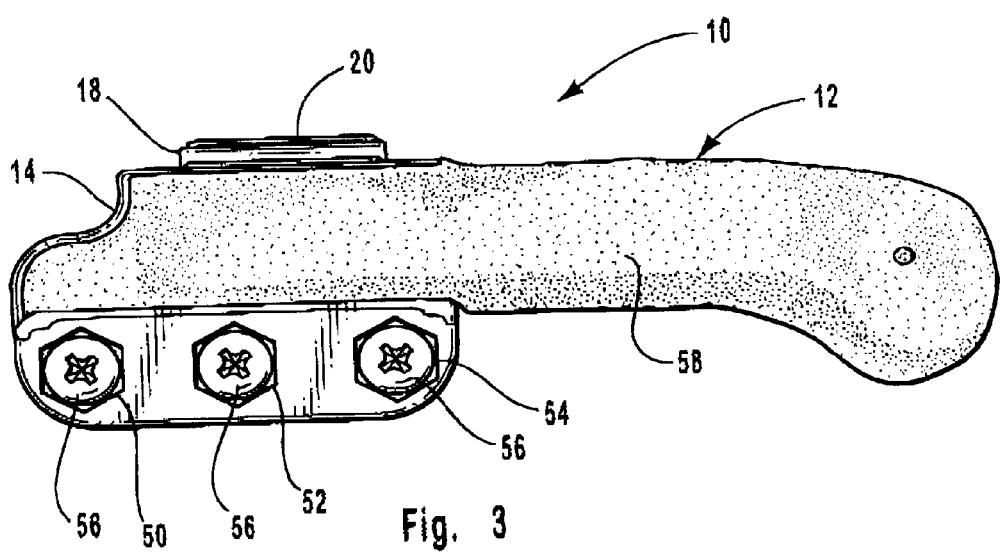
FIG. 3, a side elevation view of one side of the extension lever, as shown in FIG. 2.
Figure 4:
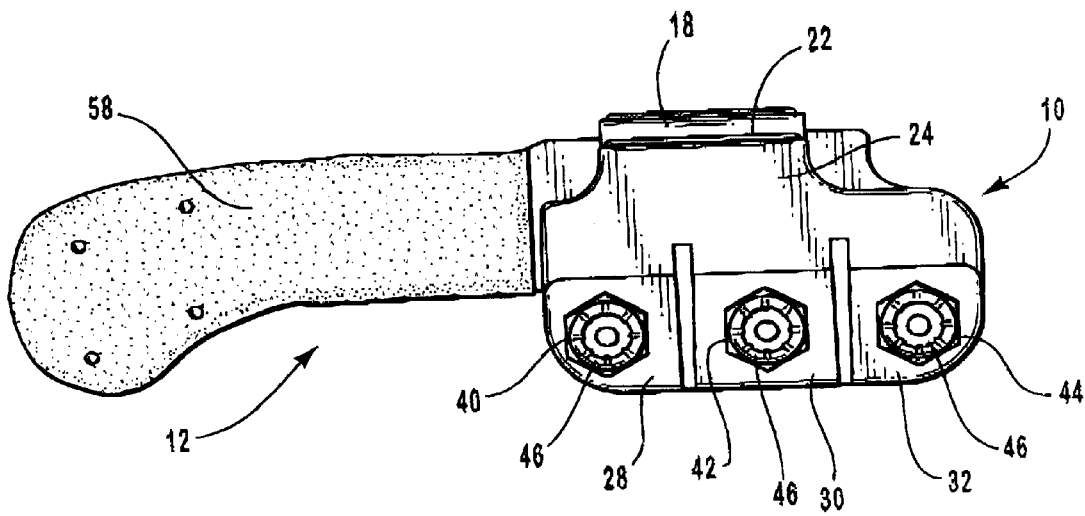
FIG. 4, a view like that of FIG. 3, but showing an opposite side.
Figure 5:
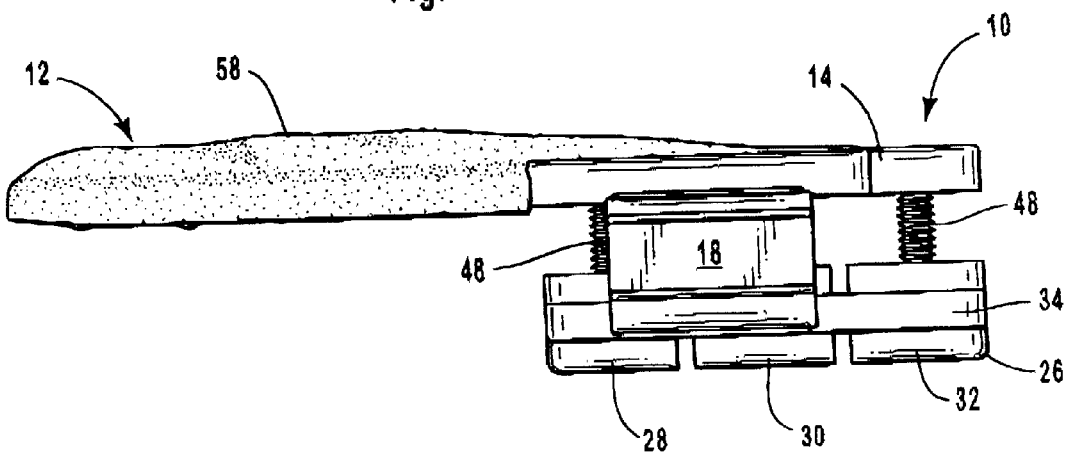
FIG. 5, a top plan view of the extension lever as shown in FIGS. 2–4.
Figure 6:
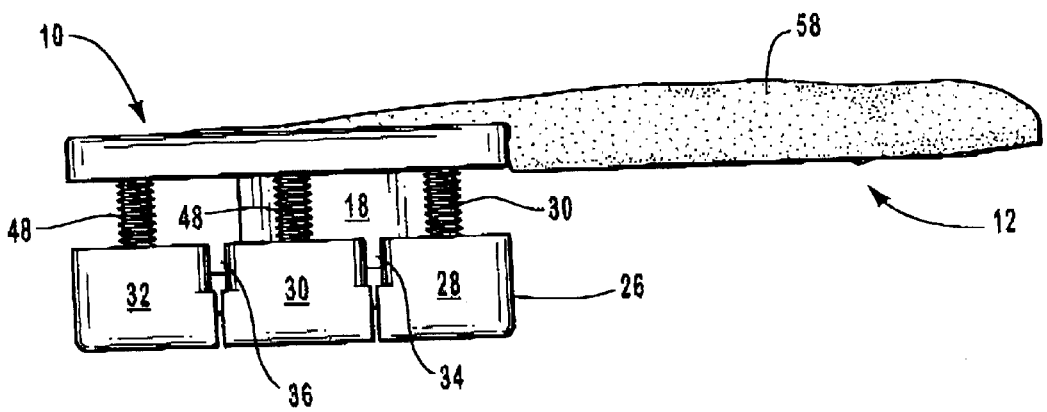
FIG. 6, a bottom plan view.
Figure 7:
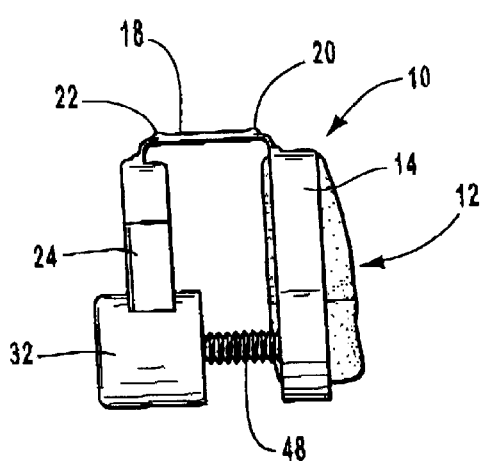
FIG. 7, and elevation view of one end.
Figure 8:
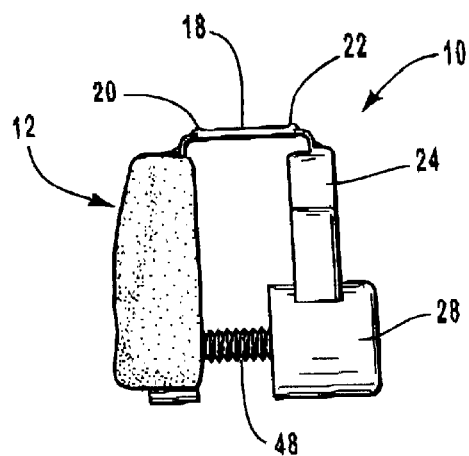
FIG. 8, a similar view of an opposite end.
Figure 9:
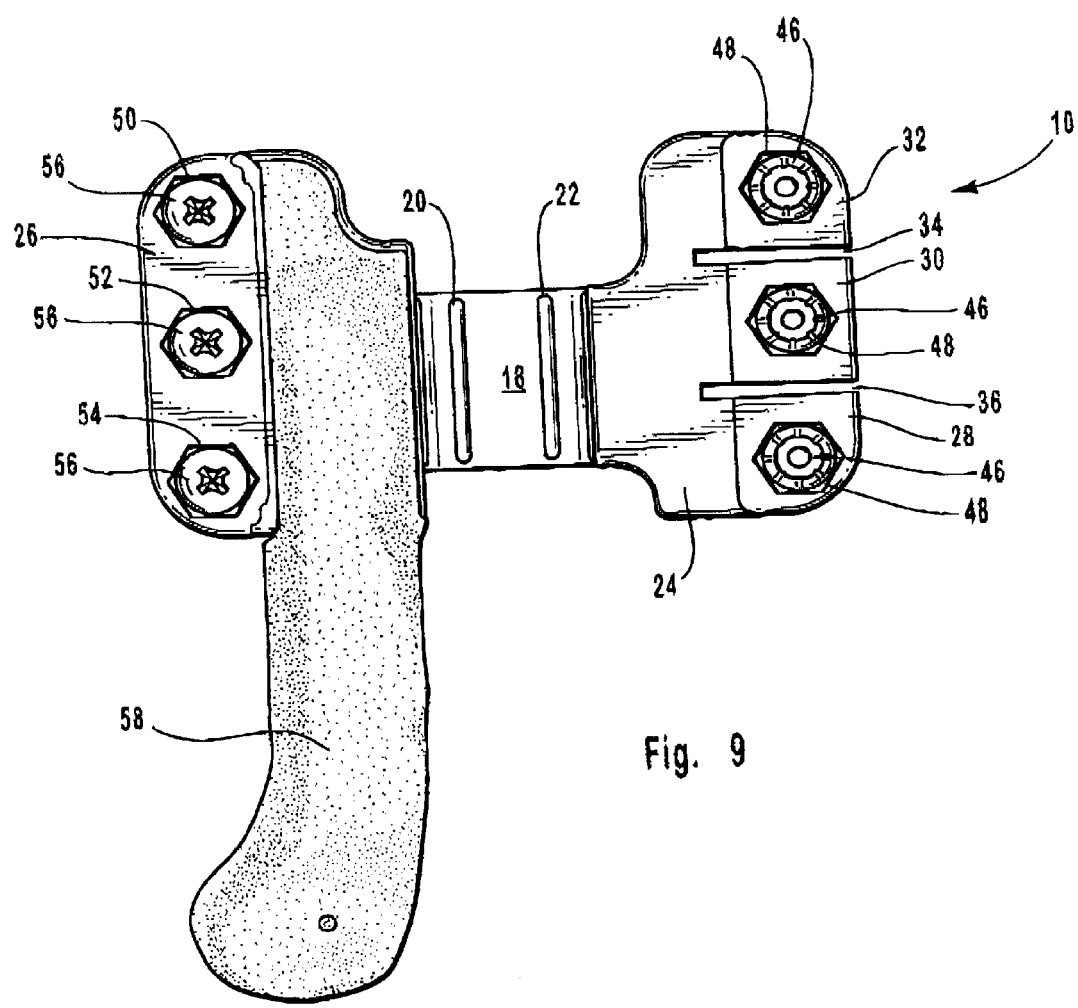
FIG. 9, a top plan view of the extension lever, as molded, in a flat condition and with the bolts and nuts in place.

Referring now to the drawings:

In the illustrated preferred embodiment, the extension lever of the invention is shown generally at 10. Extension lever 10 has an extender 12 projecting from a first attachment plate 14. A second attachment plate 16 is connected to the first attachment plate by a strap 18 having a pair of parallel extending, spaced apart hinges 20 and 22 of the well known kind often referred to as 'living hinges' that extend fully across the strap 18. Second attachment plate 16 has an intermediate portion 24 that is thicker than the strap 18 and a base portion 26 that is thicker than the intermediate portion 24. The second attachment plate 16 also has segments 28, 30 and 32, with slots 34 and 36 separating adjacent segments. The slots 34 and 36 extend from the edge 38 of the second attachment plate 16 through the base portion 26 and into the intermediate portion 24 so that the segments are individually flexible from the intermediate portion 24 to accommodate attachment of the extension lever, as will be further described. A shoulder 39 is formed on each segment between the junction of the base portion 26 and the intermediate portion 24.

Holes 40, 42 and 44 are respectively provided through the segments 28, 30 and 32 and the holes are each counter-bored to receive the heads 46 of bolts 48 inserted into the holes.

Spaced apart holes 50, 52 and 54 are provided through the thickened base portion 26 of fast attachment plate 14 and when the extension lever 10 is folded along the living hinges 20 and 22, the bolts 48 extending through the holes 40, 42, and 44 will extend into the holes 50, 52 and 54 of the first attachment plate to be threaded into nuts 56 positioned in the counter-bores of the holes 50, 52 and 54.

Extender 12 has a surface 58, generally conforming as a mirror image to the portion of a human palm that is adjacent to the base of the user's thumb.

The entire extension lever 10 is molded from a suitably strong, durable material such as nylon and extender 12 has a coating 59 of a suitable strong, soft material such as rubber that will give the extender a comfortable feel when engaged by the thumb or hand of a user.

Extension lever 10 is secured to a projecting control lever 60 (FIG. 1) by folding the extension lever along the living hinges 20 and 22 and then positioning the extension arm over the control lever such that the first and second attachment plates 14 and 16 are on opposite sides of the control lever 60. Bolts 48 are inserted through holes 40, 42 and 44 and holes 50, 52 and 54 and are threaded into nuts 56 to clamp the attachment plates securely to the control lever with the extender 12 projecting from the end of the control lever 60. The flexibility of segments 28, 30 and 32 allows the bolts 48 to thread into nuts 56 even if adjustments must be made to the positioning of the attachment plates 14 and 16 in using the extension lever 10 with different kinds and models of vehicles.

As segments 28, 30 and 32 of second attachment plate 16 are pulled toward the first attachment plate 14 by threading of bolts 48 into nuts 56 the portions of shoulder 39 on the segments are moved beneath structure of the control lever to which the extension lever is connected. The shoulder 39 further prevents rotation of the extension lever 10 relative to the control lever 60.

A user wraps the fingers of a hand around a handgrip 62 (FIG. 1) and uses the thumb of the hand to engage the surface 58 and to pull the extension lever 10 and the control lever 60 towards the handgrip 62. The user may then rotate the hand to place the portion of the palm at the base of the thumb against surface 58 to thereby use the palm of the hand to hold the extension lever and attached control lever in a throttle open position. Turning of the palm of the hand against the rubber coated surface 58 will change the throttle setting of the vehicle and the thumb does not become tired during operation of the vehicle.

Although a preferred form of my invention has been herein disclosed, it is to be understood that the present disclosure is by way of example and that variations are possible without departing from the subject matter coming within the scope of the following claims, which subject matter we regard as our invention.

We claim:

1. An extension lever for connection to a control lever of a vehicle having a handlebar comprising an extender;

a first attachment plate connected to said extender;

a second attachment plate;

a strap interconnecting said first and second attachment plates; with said extender projecting from said first attachment plate;

a pair of parallel, spaced apart hinges extending across said strap; and means interconnecting said first and second attachment plates for clamping said plates toward one another.

2. An extension lever as in claim 1, wherein the extender, attachment plates and strap are molded as one piece.

3. An extension lever as in claim 2, wherein the hinges are living hinges molded into the strap.

4. An extension lever as in claim 3, wherein the extender has a palm engagement surface comprising generally a mirror image of the portion of a human hand adjacent the base of a thumb.

5. An extension lever as in claim 4, wherein the means interconnecting said first and second attachment plates for clamping said plates towards one another comprises bolts through said plates and nuts on the ends of said bolts.

6. An extension lever as in claim 5, wherein at least one attachment plate has flexible segments through which said bolts extend.

7. An extension lever as in claim 6, further including a shoulder extending along the segments and between the attachment plates.

8. An extension lever as in claim 7, wherein the extender, attachment plates and strap are molded from nylon material.

9. An extension lever as in claim 8, further including a durable, soft covering of rubber material covering the engagement surface of the extender.

* * * * *